United States Patent Office 3,106,466
Patented Oct. 8, 1963

3,106,466
PRINT-OUT PHOTOPROCESS WITH
MEROCYANINE DYES
Robert H. Sprague, Chagrin Falls, and Harry L. Fichter, Jr., Lakewood, Ohio, assignors to Horizons Incorporated, a corporation of New Jersey
No Drawing. Filed June 14, 1961, Ser. No. 116,988
9 Claims. (Cl. 96—48)

This invention relates to a photographic process capable of producing colored photographic prints. The process is suitable for producing prints of a specific single color as well as full-color photographic prints involving suitable utilization of the primary colors of the visible spectrum. A further aspect of this invention is to provide a photosystem suitable for the production of photoresists, lithographic printing surfaces and the like.

In our application Serial No. 42,233, filed July 12, 1960, we have described the use of styryl dye bases and higher vinylene homologs thereof in combination with certain classes of organic halogen compounds to provide a photosensitive composition which was sensitive to visible light.

In our application Serial No. 95,031, filed March 13, 1961, we have described the use of cyanine dye bases in combination with certain classes of organic halogen compounds to provide a photosensitive composition which was sensitive to visible light.

In said applications, exposure to light alone, or exposure to light followed by heat treatment, was found to produce colored print-out images at high speeds directly on exposure of an originally substantially colorless product.

We have now found that merocyanine dyes may be used in like manner, to provide photosensitive compositions sensitive to visible light. Since the merocyanines are more sensitive to radiation of certain wavelengths than either the styryl dye bases or cyanine dye bases, and are in addition somewhat more readily prepared than the dye bases heretofore described, the use of merocyanine dyes is of considerable importance in color photographic applications of the type to be described.

Specifically, it has been found that a family of weakly colored dyes or dye progenitors, belonging to the class of merocyanine dyes, are capable of producing intense colors of high brilliance with narrow spectral ranges of absorption when utilized as a photosystem in combination with suitable organic halogen-containing compounds. The variety of merocyanine dyes is sufficiently broad to blanket the visible range with respect to their light-absorption qualities and also with respect to the nature of the colors produced as a result of exposure to light when utilized in combination with suitable organic halogen compounds.

While we do not wish to be bound to any specific theory as to the reason for the ability to blanket the visible with respect to sensitivity and development of color, it appears that, either as a result of exposure to light or possibly simply as the result of mixture of the organic halogen-containing compound and the weakly colored dye, a complex is formed which requires less energy to raise it to an excited state to permit the desired photolytic reaction to take place than when such complexes do not form.

It has been pointed out that the dye progenitor is weakly colored and, as a result of exposure to light in the presence of the organic halogen compound, a brilliant, intense, sharp cutting color is obtained. Equally important as the foregoing is our finding that, as a result of exposure to light with-or-without subsequent development by heat, a sharp difference in solubility in certain solvents exists between unexposed and exposed areas. This finding is of exceptional importance in order to eliminate any residual color which may exist from the progenitor itself and which might mask the desired print-out effects. More important than the elimination of such color-masking effects is the fact that such differences in solubility may be utilized for fixing and stabilization of the printed image. Equally important is our finding that, as a result of such solvent extraction, hydrophylic-hydrophobic differentiation is available, depending on whether or not the areas have been exposed to light. Thus, it appears that the developed-out dye image is ionic in character, exhibits hydrophilic properties, and tends to be insoluble in non-polar solvents; whereas the unexposed dye progenitor, even in the presence of the organic halogen-containing compound, is a covalent non-ionic compound, soluble in a variety of organic solvents, and tends to be hydrophobic in character. Such hydrophobic properties may be enhanced by placing the photosystem in a hydrophobic base. As a consequence, the system can be utilized as a foundation of photoetch purposes and as a means for producing a lithographic plate.

Solvents which may be utilized for the above described fixing and developing include ethers, esters, chlorinated solvents, benzene, toluene, and mixtures of such solvents. A differentiation is obtained even with water-compatible solvents such as acetone.

In general terms, therefore, our novel photosensitive system is utilized in a variety of ways. If it is desired to produce a single color of permanent nature as a result of a print-out reaction in the visible, a weakly colored merocyanine dye is chosen having absorption characteristics compatible with the source of light available in the visible. This is combined with a suitable organic halogen-containing compound and placed on a suitable substrate. After exposure to light, a print-out image of intense brilliance is obtained, the unexposed portions remaining the original color. The development of color may be enhanced by a brief heating for between 1 and 10 seconds at approximately 85–100° C. and preferably about 100° C. prior to solvent fixing. The developed print is then treated with a solvent, such as ether or benzene, which removes the undecomposed dye base, leaving only the developed image fixed to the substrate.

By utilizing multipacks, with an appropriate selection of color formers and exposure to the full spectral range of visible light, full-color prints may be obtained. Thus when utilizing multipacks, exposure of the film to a colored subject produces a negative image in colors complementary to the exposing light. After removal of the unexposed light-sensitive material by solvent extraction, a contact print through the negative on a second sheet of the same sensitive film results in a positive image in the same colors as the original exposure. Removal of unexposed light-sensitive material by solvent extraction of the positive print gives a stable product.

Similarly, our color-sensitive material may be used to make positive prints from commercially available color-negative materials, either by contact printing or by projection printing with an enlarger.

Full-color prints may also be obtained by printing registered dot patterns of the combination of merocyanine dye and suitable organic halogen compounds on a white or transparent backing. By utilizing known printing techniques of high resolution, the various color progenitors may be placed sufficiently close to each other so that, as a result of exposure and fixing, a full color rendition is obtained. Conversely, color-separation negatives may be obtained by standard techniques utilizing simultaneous exposures in one-shot three-color cameras available commercially.

The invention may be utilized as a foundation for a lithographic plate by minor modifications of the foregoing procedure.

The process may be modified by placing the photosensitive system on a hydrophilic substrate, such as paper, and then washing out the developed dye image with water so as to expose the paper backing in these areas. In this case, the unexposed, undecomposed system is hydrophobic and the exposed portions are hydrophilic, even though no developed dye color remains in the hydrophilic areas. Washing out the developed image with water in this way does not remove either the unexposed merocyanine dye or the unreacted organic halogen compound or the complex which may have formed by combination of the two. It is therefore possible, after drying the washed sheet, to re-expose with a blanket exposure to light and cause development of the remaining light-sensitive material, giving a positive image which requires no fixing. Our new process is thus applicable to direct positive photocopy, capable of copying colored as well as black-and-white materials.

Thus, in general, the photosensitive systems of this invention comprise a light-sensitive coating composed of a mixture of a merocyanine dye with a halogen-containing source of photolytically producible free radicals, either coated on a substrate or suitably dispersed in a solution of a binder such as nitrocellulose, polystyrene, ethyl cellulose, polyvinyl chloride, Saran, or the like, and subsequently coated on a substrate either as an adherent coating or as a non-adhering or strippable self-sustaining film.

The organic halogen-containing compound presently preferred in the photosystem of this invention is carbon tetrabromide. Other compounds which have been found suitable are those represented by the general formula $$ACBr_3$$

wherein A represents a monovalent radical selected from the group consisting of H, Cl, Br, alkyl, substituted alkyl, aryl and substituted aryl.

Organic compounds found useful in this photosystem include

Carbon tetrabromide     Hexabromethane
Bromoform     Benzotribromide
Pentabromethane The merocyanine dyes useful in the present invention include dyes corresponding to the following general formula:

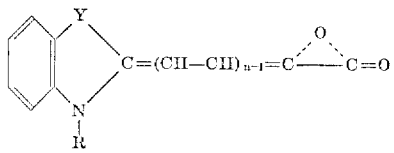

wherein R is selected from the group consisting of lower alkyl, aryl and aralkyl; Y represents the non-metallic atoms necessary to complete a heterocyclic nucleus with from 5 to 6 atoms in the heterocyclic ring; $n$ is an integer of from 1 to 2; and Q represents the nonmetallic atoms necessary to complete a five-membered or six-membered heterocyclic nucleus. The dyes effective for the present invention are those exemplified in the examples which follow and in which the left hand nucleus in the general formula is selected from the group consisting of benzoxazole, benzothiazole, and quinoline and in which the right hand nucleus is selected from the group consisting of N-ethyl indole, phenyl-isoxazolone and 3-ethyl rhodanine. These dyes include the several classes of merocyanine dyes, including merocyanines, merocarbocyanine, and meropolycarbocyanines.

It is preferred that the combination of merocyanine dye and organic halogen-containing compound be dispersed in a film-forming binder such as the following:

Ethyl cellulose in methyl alcohol
Nitrocellulose in methyl alcohol or acetone
Polystyrene in benzene
Polyvinyl chloride in tetrahydrofuran
Polyvinylidene copolymer in methyl ethyl ketone
Cellulose acetate in acetone
Polyvinyl acetate in toluene plus acetone In addition, conventional plasticizers may be incorporated into the above solutions or, if desired, hydrocarbons may be added as a diluent in the composition. Suitable hydrocarbon diluents, which appear to play no part in the photochemical reaction, include paraffin- and isoparaffin-hydrocarbons, having the general formula, $C_nH_{2n+2}$, wherein $n$ ranges from about 10 up to 70. When added to the system, it is preferred that they be added in solution.

In the compositions of the present invention it is preferred to provide about 10 to 100 parts by weight of the organic halogen-containing compound for each part by weight of merocyanine dye, dispersed or dissolved in about 200 parts by weight of a 10% solution of a film-forming plastic.

Having described our invention in general terms, the following examples are indicative of specific methods of practice and are to be construed as illustrative rather than as limitative of the invention.

*Example 1*

Fifty milligrams of the merocyanine dye, 3-ethyl-5-[(3-ethyl-2(3H)-benzoxazolylidene)ethylidene]rhodanine,

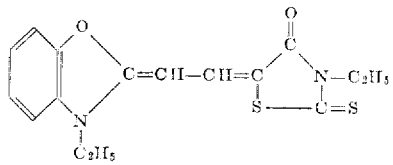

were dissolved in 16 cc. of a 10% nitrocellulose-in-acetone solution containing 2.8 grams of carbon tetrabromide. The mixture was coated by draw-down application, 0.0015-inch wet thickness, on white opaque polyvinyl chloride sheeting. The dried coating was light orange in color and, when exposed to the irradiation of a General Electric Sunlamp for one second, the color changed to a reddish brown with a net transmission density of 0.1 when measured on an Eastman Kodak densitometer. A five-second exposure gave a net density of 0.4. Good quality renditions were observed when this coating was exposed through a photographic negative.

Monochromator exposures at 4000 A., with slit width of 5 mm., gave a net density of 0.11 on sixty-second exposure. At 4500 A., 0.2 density; at 5000 A., 0.21 density; and at 5500 A., 0.1 density was observed for sixty-second exposures, indicating maximum sensitivity at approximately 5000 A. Fixing of the image was achieved by a brief wash in a solvent system consisting of three parts of ethyl acetate in seventeen parts of toluene, which extracts the unreated activator (CBr₄), rendering the system inert to further exposure to light, and substantially removes the weakly colored sensitizer from the unexposed areas.

*Example 2*

Fifty milligrams of the merocarbocyanine dye, 1-ethyl-3-[(3-ethyl-2(3H)-benzoxazolylidene)-ethylidene]-oxindole,

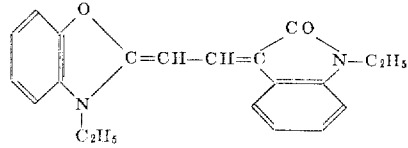

were dissolved in 16 cc. of a 10% nitrocellulose solution in acetone containing 2.8 grams of carbon tetrabromide.

The mixture was coated by draw-down application, .0015-inch wet thickness, on white opaque polyvinyl chloride sheeting. The dried coating was yellow in color and, when exposed to the irradiation of a General Electric Sunlamp for two seconds, the color changed to a pale brown with a net transmission density of 0.1 when measured on an Eastman Kodak densitometer. A five-second exposure gave a net density of 0.15, and six seconds gave a net density of 0.19. When exposed through a photographic negative, good quality prints were obtained. Fixing of the image was achieved in the manner described in Example 1.

*Example 3*

Twenty-five milligrams of the merocarbocyanine dye, 4-[(3-ethyl-2(3H)-benzoxazolylidene)-ethylidene]-3 - phenyl-5(4H)-isoxazolone,

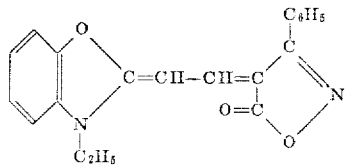

were dissolved in 8 cc. of a 10% nitrocellulose solution in acetone containing 1.4 grams of carbon tetrabromide. The mixture was coated on white opaque polyvinyl chloride sheets and dried. The coating was yellow in color and, when exposed to light from a General Electric Sunlamp, gave an orange-colored image. A four-second exposure showed a net transmission density of 0.1 when measured on an Eastman Kodak densitometer, and a seven-second exposure gave a density of 0.15. When exposed through a photographic negative, good renditions were observed. Fixing was achieved by solvent wash as described in Example 1.

*Example 4*

Twenty-five milligrams of the merocyanine dye, 3-ethyl-5-(3-ethyl-2(3H)-benzothiazolylidene)rhodanine,

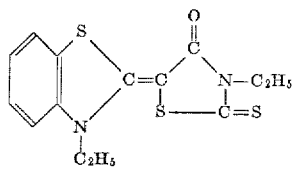

were dissolved in 8 cc. of a 10% nitrocellulose solution in acetone containing 1.4 grams of carbon tetrabromide. The mixture was coated on white opaque polyvinyl chloride sheets and dried. The coating was pale yellow in color and, when exposed to light from the General Electric Sunlamp, the color changed to a much darker pinkish orange. An exposure of thirty seconds gave an approximate net density of 0.1. Fixing was achieved by solvent wash as described in Example 1.

Substitution of the dye, 3-ethyl-5-(1-ethyl-2(1H)-quinolylidene)rhodanine,

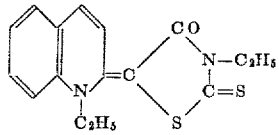

in the above formula resulted in an orange coating which gave deep chocolate-brown color in thirty-seconds exposure to the light from a General Electric Sunlamp at a distance of 6 inches from the bulb. Fixing was achieved by solvent extraction as before.

Having now described the invention in accordance with the patent statutes, we claim:

1. A light sensitive composition comprising
   (1) an organic bromine compound represented by the general formula

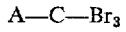
   A—C—Br$_3$ wherein A is a monovalent radical selected from the group consisting of H, Cl, Br, alkyl and aryl and
   (2) a merocyanine dye selected from the group characterized by the general formula

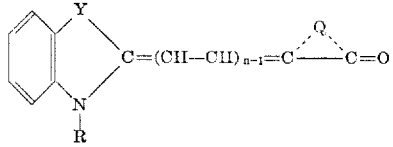

wherein R is selected from the group consisting of lower alkyl, aryl and aralkyl; Y represents the non-metallic atoms necessary to complete a heterocyclic nucleus selected from the group consisting of benzoxazole, benzothiazole and quinoline; n is an integer of from 1 to 2; and Q represents the non-metallic atoms necessary to complete a heterocyclic nucleus selected from the group consisting of N-ethyl indole, phenyl isoxazolone, and 3-ethyl rhodanine;
   said composition being distributed uniformly in a thin support layer.

2. The composition of claim 1 dispersed in a film-forming plastic binder.

3. The material of claim 2 as a self-supporting film.

4. The composition of claim 1, wherein for each part by weight of merocyanine dye there are present between 10 and 100 parts by weight of the organic bromine containing compound.

5. The composition of claim 1, wherein the organic bromine containing compound is a bromine substituted methane.

6. The composition of claim 5, wherein the compound is CBr$_4$.

7. The composition of claim 10, wherein the merocyanine dye is 3-ethyl-5-[(3-ethyl-2(3H)-benzoxazolylidene)ethylidene]rhodanine,

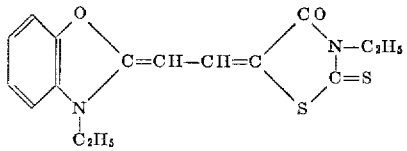

8. The process for producing a direct print-out image in color, which comprises: preparing a thin film of the composition of claim 1, exposing said composition to visible light from a colored subject and fixing the resulting image by washing any unreacted organic bromine compound from the exposed composition.

9. The composition of claim 1 disposed on a solid organic substrate.

References Cited in the file of this patent
UNITED STATES PATENTS

| | | |
|---|---|---|
| 2,186,624 | Brooker | Jan. 9, 1940 |
| 2,282,116 | Brooker | May 5, 1942 |
| 2,692,829 | Aubert et al. | Oct. 26, 1954 |

FOREIGN PATENTS

| | | |
|---|---|---|
| 209,993 | Germany | May 14, 1909 |

UNITED STATES PATENT OFFICE
CERTIFICATE OF CORRECTION

Patent No. 3,106,466　　　　　　　　　　　　October 8, 1963

Robert H. Sprague et al.

It is hereby certified that error appears in the above numbered patent requiring correction and that the said Letters Patent should read as corrected below.

Column 6, line 44, for the claim reference numeral "10" read -- 1 --.

Signed and sealed this 21st day of April 1964.

(SEAL)
Attest:

ERNEST W. SWIDER

Attesting Officer

EDWARD J. BRENNER

Commissioner of Patents